G. WALTHER.
TRACTOR WHEEL.
APPLICATION FILED OCT. 30, 1919.

1,393,927.

Patented Oct. 18, 1921.
2 SHEETS—SHEET 1.

Inventor
George Walther,

Attorneys

G. WALTHER.
TRACTOR WHEEL.
APPLICATION FILED OCT. 30, 1919.
1,393,927.
Patented Oct. 18, 1921.
2 SHEETS—SHEET 2.
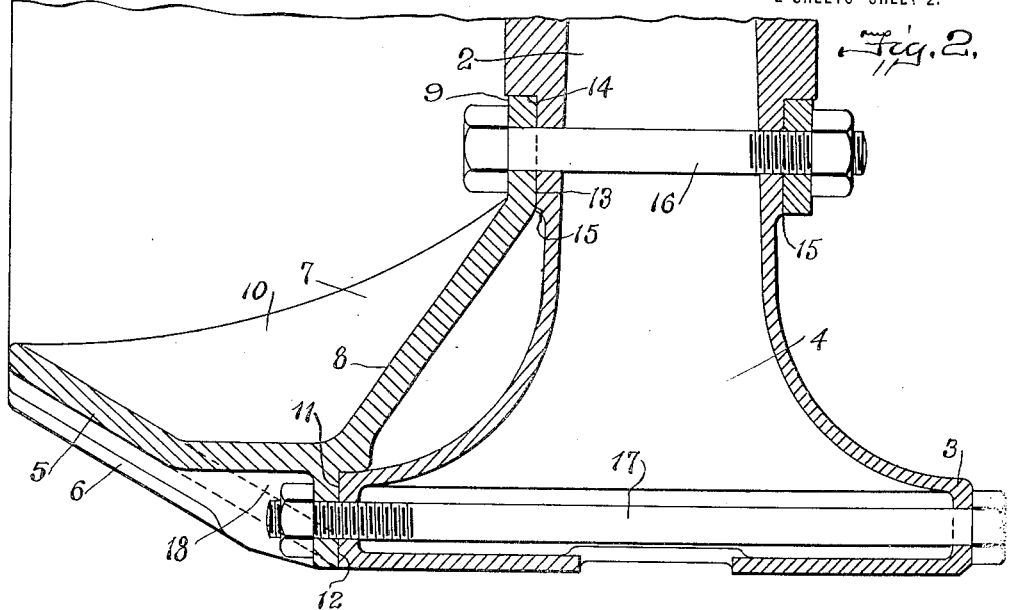
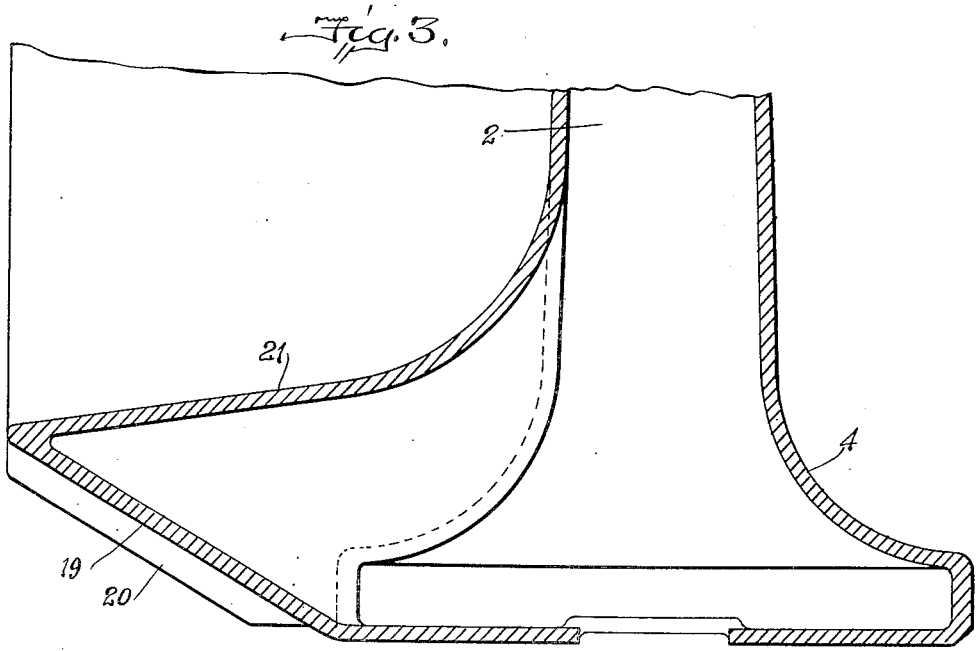
Inventor
George Walther,
Attorney

UNITED STATES PATENT OFFICE.

GEORGE WALTHER, OF DAYTON, OHIO, ASSIGNOR TO THE DAYTON STEEL FOUNDRY COMPANY, OF DAYTON, OHIO, A CORPORATION OF OHIO.

TRACTOR-WHEEL.

1,393,927.   Specification of Letters Patent.   Patented Oct. 18, 1921.

Application filed October 30, 1919. Serial No. 334,450.

*To all whom it may concern:*

Be it known that I, GEORGE WALTHER, a citizen of the United States, residing at Dayton, in the county of Montgomery and State of Ohio, have invented certain new and useful Improvements in Tractor-Wheels, of which the following is a specification, reference being had therein to the accompanying drawing.

This invention relates to improvements in tractor wheels and has for its object to improve the well known hollow spoke, integrally-cast class B tractor wheels manufactured under my Patent No. 1,120,256, issued December 8th, 1914, and used extensively by the United States Government during the period of the recent war and thereafter, the invention being adaptable, however, to the general construction of tractor wheels of which the class B wheel is a type.

The main object of the invention is to provide tractor wheels of this type with a supplemental tread extending laterally of the main tread of the wheel and arranged in a plane having a shorter radius to the axis of the wheel than the main tread.

As shown in the accompanying drawings such a tread may be cast integrally with the wheel, or may be detachably secured thereto in any suitable form, a preferred construction in one form being shown in the drawings. The supplemental tread may be arranged at any desired angle relative to the main tread or may be arranged in a plane parallel to the plane of the main tread, the angular relation of the treads, however, being the preferred construction.

The purpose of the supplemental tread is to adapt the tractor wheel for operation on either hard or soft soil, the main tread only functioning when the wheel is operated over a hard road or hard soil, and the combined treads functioning when the wheels are operated over soft soil, all or only a portion of the supplemental tread where the angular construction is used being brought into operation according to the depth the wheel penetrates the ground.

I am aware that neither the detachable supplemental tread or the integrally-cast supplemental tread, or the angularly related supplemental tread are new *per se* in this art and I do not claim the invention as such. However, these features as modified and specifically applied to my improved wheel of earlier invention and construction effect a novel combination of tractor wheel elements which result in a wheel of surpassing merit with respect to both structural features and operating advantages.

In the drawings:

Fig. 2 is a cross sectional view taken on the line 2—2 of Fig. 1;

Fig. 3 is a vertical cross sectional view of a tractor wheel embodying my improved supplemental tread in the integral form of construction.

Figure 1:
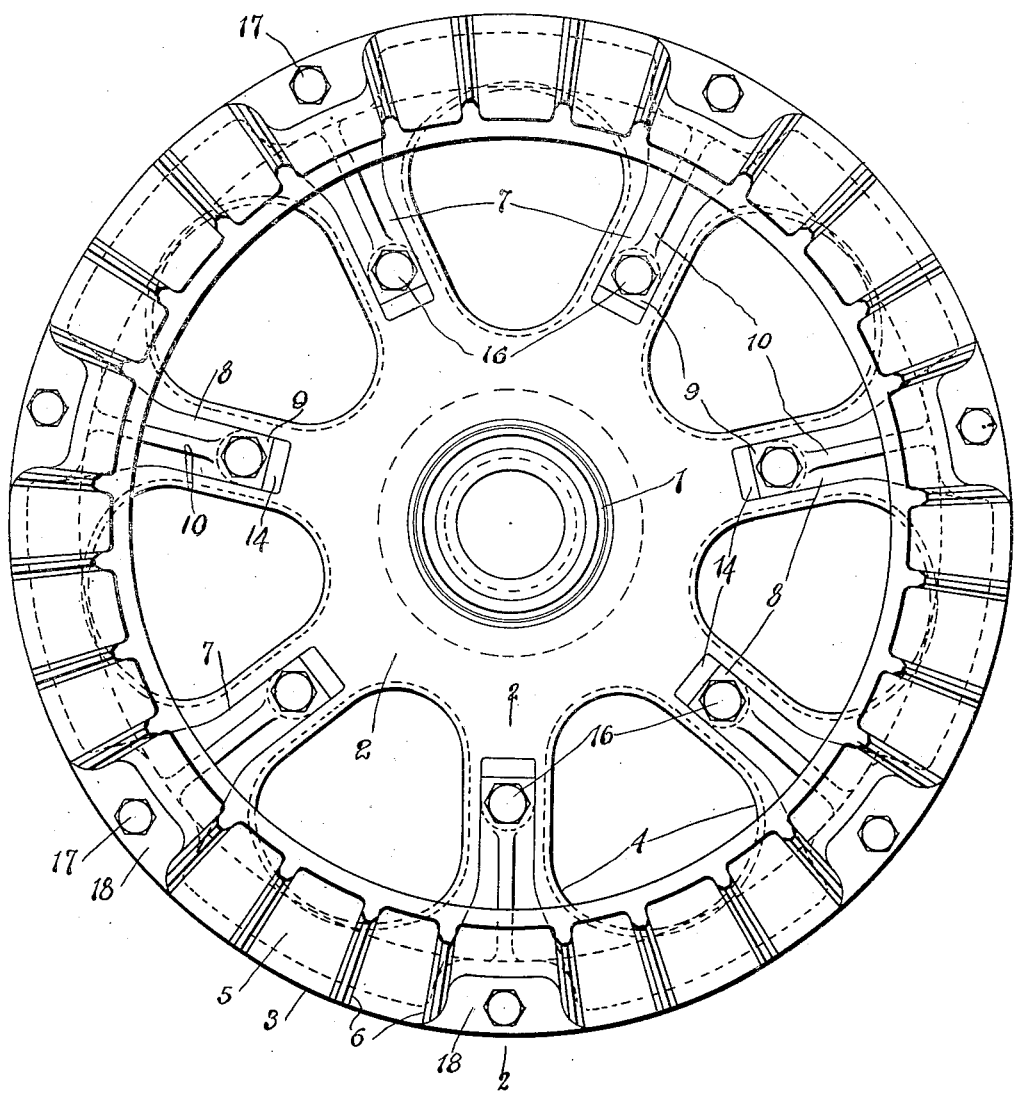
Figure 1 is a side elevation in perspective of a tractor wheel embodying my improved supplemental tread in the detachable form of construction.

As shown in Figs. 1 and 2 of the drawings a wheel of standard construction consisting of the hub 1, spokes 2 and rim 3 is cast integrally, the construction here shown being the class B wheel to which reference has been made herein. The characteristics of this wheel are the hollow hub and spokes, the spokes tapering slightly outwardly and merging into the rim in wide sweeping curves 4—4, the curved portions of the opposite spokes also in effect merging with each other, thus forming a wheel of great strength and symmetrical outline, in all respects admirably adapted to its intended purposes.

To the integral wheel thus formed the supplemental tread of the present invention may be secured in any suitable manner. As shown in Figs. 1 and 2 the supplemental tread is cast integrally and consists of the inclined or angular tread portion 5 which may be formed at any suitable angle to the main tread or rim 3. Cleats 6 are preferably arranged on the tread 5 at suitable intervals to increase the traction of the wheel.

To mount the supplemental treads on the main wheel the treads 5 are provided with inwardly projecting arms or supplemental spokes 7 which are cast integrally with the tread and act as a reinforcement therefor, the arms or spokes consisting of a flange portion 8 inclined inwardly toward the adjacent spoke of the wheel and terminating in an apertured end 9 extending substantially parallel to the vertical plane of the axis of the wheel, the arms being reinforced by an angular web 10 interposed between the flange 8 and the tread 5. The supplemental tread is further provided at its inner edge with a contact surface 11 extending entirely around the tread and adapted to form a juncture with a corresponding contact surface 12 formed by the outer edge of the rim 3 of the main wheel. Each spoke of the main wheel is provided with contact surfaces 13 adapted to form a juncture with the end 9 of one of the flanges 8, a shoulder 14 being formed on the spoke at right angles to the surface 13 and serving as an end buttress for the spokes or arms of the supplemental tread. The sides of the spokes opposite the surfaces 13 are provided with pads or lugs 15, the spokes being apertured through the corresponding opposite surfaces in alinement with the apertured ends of the flanges 8, to receive a bolt 16 which serves to secure the ends of the spokes of the detachable tread to the spokes of the main wheel. At its outer edge the detachable tread is secured to the felly of the main wheel by means of a bolt 17, the detachable tread being provided with a suitable depression 18 to provide clearance for inserting the bolt through the parts and to bring the head of the bolt within the tread line of the wheel when the parts are assembled.

As shown in one form in Fig. 3 my improved wheel may also be made integrally. For certain types of trucks or certain regular uses the integral wheel is to be preferred. Where the trucks equipped with these wheels are more or less constantly operated over loose soil or dirt roads the integral wheel meets all requirements as the supplemental treads are always on the wheel and do not interfere with the normal functioning of the main tread when the truck is traveling over hard soil or an improved road. However, for trucks operated for the most part over improved roads and only occasionally over loose soil or dirt roads, the detachable supplemental tread is preferred, as the same can be readily detached from the wheel, thereby materially lessening its weight, and need be applied to the wheel only when the condition of the road or soil to be traveled over requires it.

As here shown the integral supplemental tread consists of the inclined tread portion 19 having cleats 20 arranged upon its periphery at suitable intervals. The supplemental tread merges directly with the main tread as clearly shown in the drawing, and is reinforced from the spokes 2 by hollow, outwardly extending portions 21 of the spokes which merge into the inclined tread in wide sweeping curves, thus maintaining in the further application thereof the novel features of my earlier improved wheel herein referred to, of which the class B wheel is a type.

From the foregoing detailed description the construction and characteristics of my improved tractor wheel will be readily comprehended by those skilled in this art. The great strength of the wheel with comparative lightness which results from the hollow hub and spokes; the self cleaning qualities of the wheel which results from the long curvatures of the converging surfaces; the compensating angular tread which adapts the wheel to a wide variation in the condition of the soil or roads over which the wheels are operated, and the rightness of metal proportions and general correctness of design which provide for wear, wheel shocks and load stress; all combined in a wheel of great merit.

Having thus fully described my invention, what I claim as new and desire to secure by Letters Patent, is:—

The combination with a metal wheel comprising a main tread arranged parallel to the axis of the wheel and hollow spokes having oppositely directed curves extending substantially to the edges of the main tread, of a supplemental tread member secured to the wheel inclined inwardly of the main tread and adapted to coöperate with said tread and wheel when the wheel is functioning over soft ground, each spoke having a lateral spoke extension extending outwardly in a wide curve and merging with and supporting the supplemental tread.

In testimony whereof I affix my signature.

GEORGE WALTHER.